US011777927B1

(12) United States Patent
Abid et al.

(10) Patent No.: US 11,777,927 B1
(45) Date of Patent: Oct. 3, 2023

(54) MONITORING SYSTEM FOR PROVIDING A SECURE COMMUNICATION CHANNEL BETWEEN A CLIENT COMPUTER AND A HOSTING COMPUTER SERVER

(71) Applicant: ALSCO Software LLC, Shelby Township, MI (US)

(72) Inventors: Kifah Hussain Abid, Kurdistan (IQ); Mohammed Kifah Hussain, Shelby Township, MI (US); Yasser Kifah Hussain, Shelby Township, MI (US); Zayd Kifah Hussain, Shelby Township, MI (US)

(73) Assignee: ALSCO Software LLC, Shelby Township, MI (US)

( * ) Notice: Subject to any disclaimer, the term of this patent is extended or adjusted under 35 U.S.C. 154(b) by 0 days.

(21) Appl. No.: 18/144,927

(22) Filed: May 9, 2023

(51) Int. Cl.
*H04L 9/40* (2022.01)
*H04L 9/32* (2006.01)
*G06F 21/34* (2013.01)

(52) U.S. Cl.
CPC .......... *H04L 63/0853* (2013.01); *G06F 21/34* (2013.01); *H04L 9/3228* (2013.01); *H04L 63/0838* (2013.01); *H04L 63/0876* (2013.01); *H04L 63/0884* (2013.01)

(58) Field of Classification Search
CPC ............... H04L 63/0853; H04L 9/3228; H04L 63/0838; H04L 63/0876; H04L 63/0884; G06F 21/34
See application file for complete search history.

(56) References Cited

U.S. PATENT DOCUMENTS

2014/0157381 A1* 6/2014 Disraeli ............... H04L 63/0853 726/7
2021/0266312 A1* 8/2021 Hong .................. H04L 63/0853

\* cited by examiner

*Primary Examiner* — Huan V Doan
(74) *Attorney, Agent, or Firm* — Buckert Patent & Trademark Law Firm PC; John F. Buckert

(57) ABSTRACT

A monitoring system having a secure computer server, a client computer, and the hosting computer server is provided. The client computer sends a webpage file having the telephone number to the secure computer server. The secure computer server sends a verification code message having a verification code to a smartphone, when the telephone number is associated with an authorized user. The secure computer server sends a webpage file to the client computer when the telephone number is associated with the authorized user. The client computer sends a webpage file having the verification code to the secure computer server. The secure computer server generates a secure communication channel between the client computer and the hosting computer server when a telephone number and a verification code are correct.

9 Claims, 18 Drawing Sheets

Registered User Database

| ID | Phone | Full Name | IP Address | Type | Verification Code |
|---|---|---|---|---|---|
| 85 | 13478414127 | Musafa Razzaq | 37.238.47.38 | Android | 4281 |
| 8 | 16194938665 | Mustafa AlQassi | 39.238.47.38 | ios | 5598 |

FIG. 2

IP Database

| Requesting IP Address | Country Name | Country Flag | State Name | City Name | Postal/Zip Code |
|---|---|---|---|---|---|
| 50.253.239.118 | United States | United States | Michigan | Grand Rapids | 49503 |
| 49.255.339.418 | United States | United States | Michigan | Rochester Hills | 48307 |

| Network IPs | Latitude/Longitude | Continent Name | Continent Code | ASN Number | ASN Organization | ISP Name | Time |
|---|---|---|---|---|---|---|---|
| 50.253.239.0724 | 42.9656 -85.65 | North America | NA | 7922 | Comcast 7922 | Comcast | 2023-03-05 03:56:24 |
| 51.253.776.0123 | 44.9656 -25.25 | North America | NA | 7924 | Comcast 7950 | Comcast | 2023-03-05 03:57:52 |

FIG. 3

MONITORING SYSTEM FOR PROVIDING A SECURE COMMUNICATION CHANNEL BETWEEN A CLIENT COMPUTER AND A HOSTING COMPUTER SERVER

BACKGROUND

Two-way authentication systems have been utilized to authenticate user login credentials. The two-way authentication systems utilize an API, or a password and a user ID, or a challenge handshake authentication, or a biometric authentication.

The inventors herein have recognized a need for an improved monitoring system that utilizes two-way authentication to authenticate a user, and thereafter sets up a secure communication channel between the client computer and a hosting computer server utilizing an intermediate secure computer server without utilizing an API, or a password and a user ID, or a challenge handshake authentication, or a biometric authentication.

SUMMARY

A monitoring system for providing a secure communication channel between a client computer and a hosting computer server is provided. The monitoring system includes a secure computer server operably communicating with the client computer and the hosting computer server. The client computer has a first IP address. The secure computer server has a second IP address. The hosting computer server has a third IP address. The secure computer server further associates the second IP address to the hosting computer server that hosts a login webpage file. The secure computer server receives a first request message from the client computer. The first request message requests the login webpage file from the hosting computer server. The secure computer server sends a telephone number request webpage file to the client computer in response to the first request message utilizing the first IP address. The telephone number request webpage file requests a telephone number of a user of the client computer. The client computer inserts a telephone number associated with the user into the telephone number request webpage file to obtain a modified telephone number request webpage file and sends the modified telephone number request webpage file to the secure computer server utilizing the second IP address. The secure computer server sends a verification code message having a first verification code thereon to a smartphone utilizing the telephone number, when the telephone number is associated with an authorized user who is authorized to access the login webpage file. The secure computer server sends a verification code request webpage file to the client computer utilizing the first IP address when the telephone number is associated with the authorized user who is authorized to access the login webpage file. The verification code request webpage file requests a verification code. The client computer inserts a second verification code into the verification code request webpage file to obtain a modified verification code request webpage file and sends the modified verification code request webpage file to the secure computer server utilizing the second IP address. The secure computer server generates the secure communication channel between the client computer and the hosting computer server utilizing the first and third IP addresses when the second verification code is identical to the first verification code. The secure computer server sends the first request message requesting the login webpage file to the hosting computer server utilizing the third IP address when the secure communication channel is generated.

BRIEF DESCRIPTION OF THE DRAWINGS

FIG. 2 is a schematic of a registered user database utilized by the monitoring system of FIG. 1;

FIG. 3 is a schematic of an IP database utilized by the monitoring system of FIG. 1;

DETAILED DESCRIPTION

Figure 1:
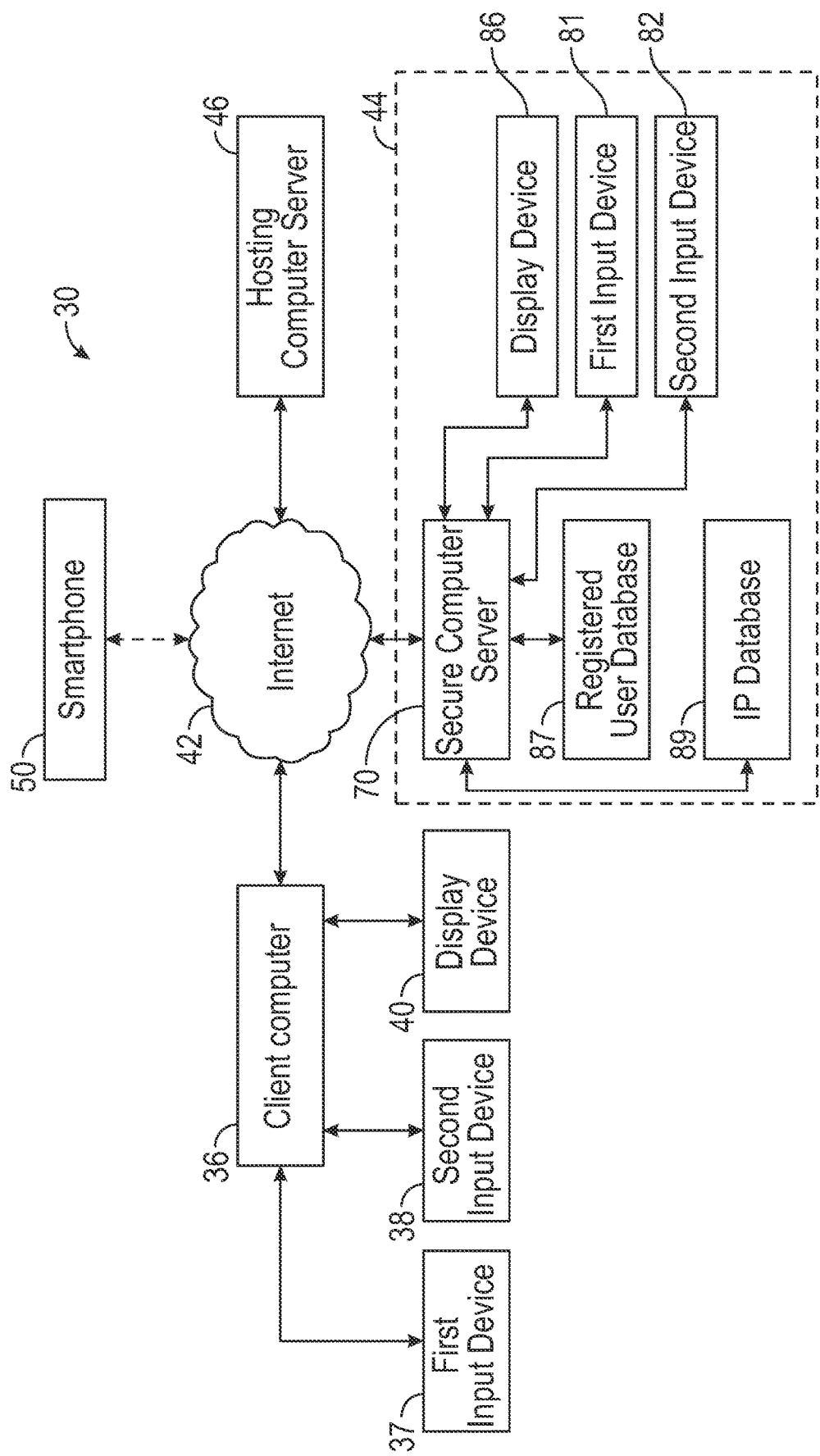
FIG. 1 is a schematic of a communication system having a monitoring system that provides a secure communication channel between the client computer and a hosting computer server, in accordance with an exemplary embodiment.
Figure 20:
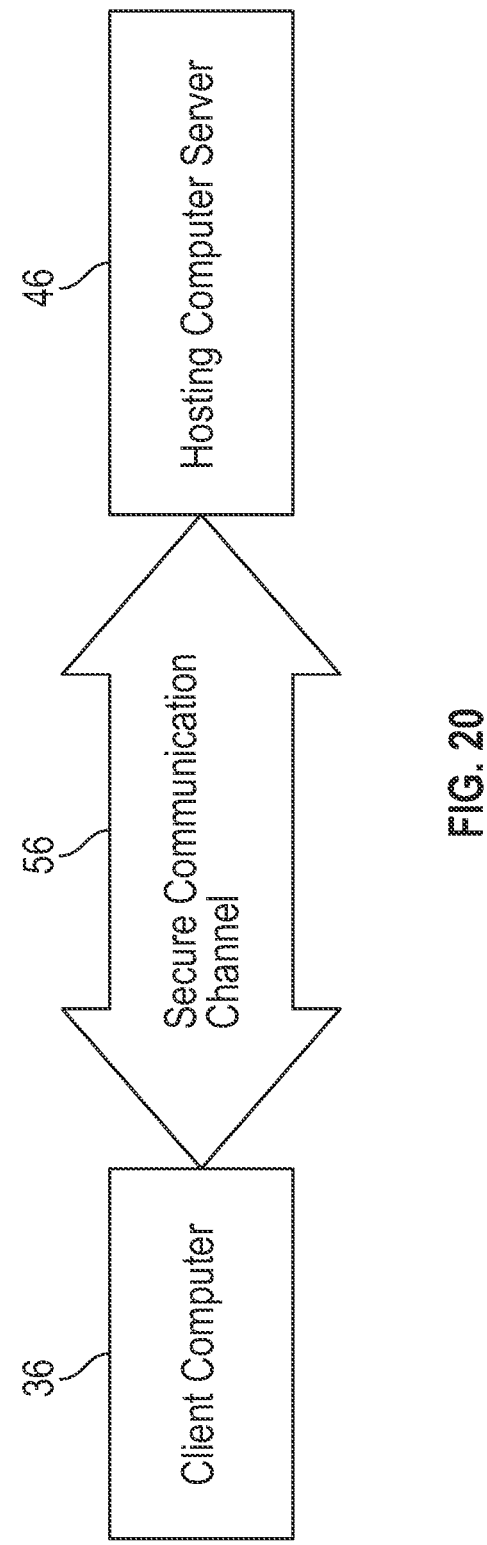
FIG. 20 is a block diagram of a client computer, a secure communication channel, and a hosting computer server utilized in the communication system of FIG. 1.

Referring to FIGS. 1 and 20, a communication system 30 having a monitoring system 44 in accordance with an exemplary embodiment that provides a secure communication channel 52 between a client computer 36 and a hosting computer server 46 is illustrated.

The communication system 30 includes the client computer 36, a first input device 37, a second input device 38, a display device 40, the Internet 42, the monitoring system 44, the hosting computer server 46, and a smart phone 50.

For purposes of understanding, a few technical terms utilized in this document will be defined hereinafter.

The term "IP" means internet protocol which is a set of rules governing the format of data sent over the Internet or other network.

The term "webpage file" means a computer file that a web browser on a computer utilizes to display a webpage. A webpage file is graphically seen as a webpage on a web browser.

The term "modified webpage file" means a webpage file having additional user added data therein.

The term "secure communication channel" means a method of communication that is designed to ensure the confidentiality, privacy, and integrity of the information being transmitted between two parties. In particular, a secure communication channel is established between a client computer and a hosting computer server using both a one-to-one encryption channel between a secure computer server and a hosting computer server, and a one-to-one encryption channel between the secure computer server and a client computer to prevent unauthorized access or interception of the information during transmission. In particular, all information/data sent between the client computer and the secure computer server are encrypted at the sender and decrypted at the receiver. Further, all information/data sent between the secure computer server and the hosting computer server are encrypted at the sender and decrypted at the receiver. A one-to-one encryption channel uses a symmetric key encryption algorithm at a sender to encrypt information/data and another symmetric key encryption algorithm at the receiver to decrypt the received information/data. The sender of the information/data sends a key to the receiver to allow a symmetric key encryption algorithm at the receiver to decrypt the received encrypted information/data, making it difficult for an attacker to intercept or tamper with the information during transmission.

The term "hosting computer server" means a computer server that hosts a login webpage file.

The term "authorized user" means a user who is authorized to access a login webpage file on a hosting computer server.

Client Computer

The client computer 36 is operably coupled to and communicates with the Internet 42, the first input device 37, the second input device 38, and the display device 40. The client computer 36 receives inputted data from the first input device 37 (e.g., keyboard) and displays the inputted data on the display device 40. The client computer 36 also receives commands from the second input device 38 (e.g., mouse) for controlling operation of the client computer 36.

Monitoring System

The monitoring system 44 is operably coupled to the Internet 42 and is provided to generate a secure communication channel 52 between the client computer 36 and the hosting computer server 46. The monitoring system 44 operably communicates with the Internet 42, the client computer 36, the hosting computer server 46, and the smart phone 50. The monitoring system 44 includes a secure computer server 70, a first input device 81 (e.g., keyboard), a second input device 82 (e.g., mouse), a display device 86, a registered user database 87, and an IP database 89 operably coupled to the secure computer server 70. The first input device 81 allows a user to input information for controlling operation of the monitoring system 44. The second input device 82 allows the user to select commands for controlling operation of the monitoring system 44. The display device 86 displays information associated with the monitoring system 44. The registered user database 87 and the IP database 89 will be explained in greater detail below.

An advantage of the monitoring system 44 is that the system 44 utilizes two-way authentication to authenticate a user, and thereafter sets up a secure communication channel 52 between the client computer 36 and a hosting computer server 46 utilizing an intermediate secure computer server 70 without utilizing an API, or a password and a user ID, or a challenge handshake authentication, or a biometric authentication.

The secure computer server 70 is provided to set up a secure communication channel 52 between the client computer 36 and the hosting computer server 46 utilizing the registered user database 87 and the IP database 89, as will be explained in greater detail below.

Referring to FIGS. 4-6 and 8-14, a brief explanation of the webpage files and associated webpages utilized by the secure computer server 70, the client computer 36, and the hosting computer server 46 will be provided.

Figure 4:
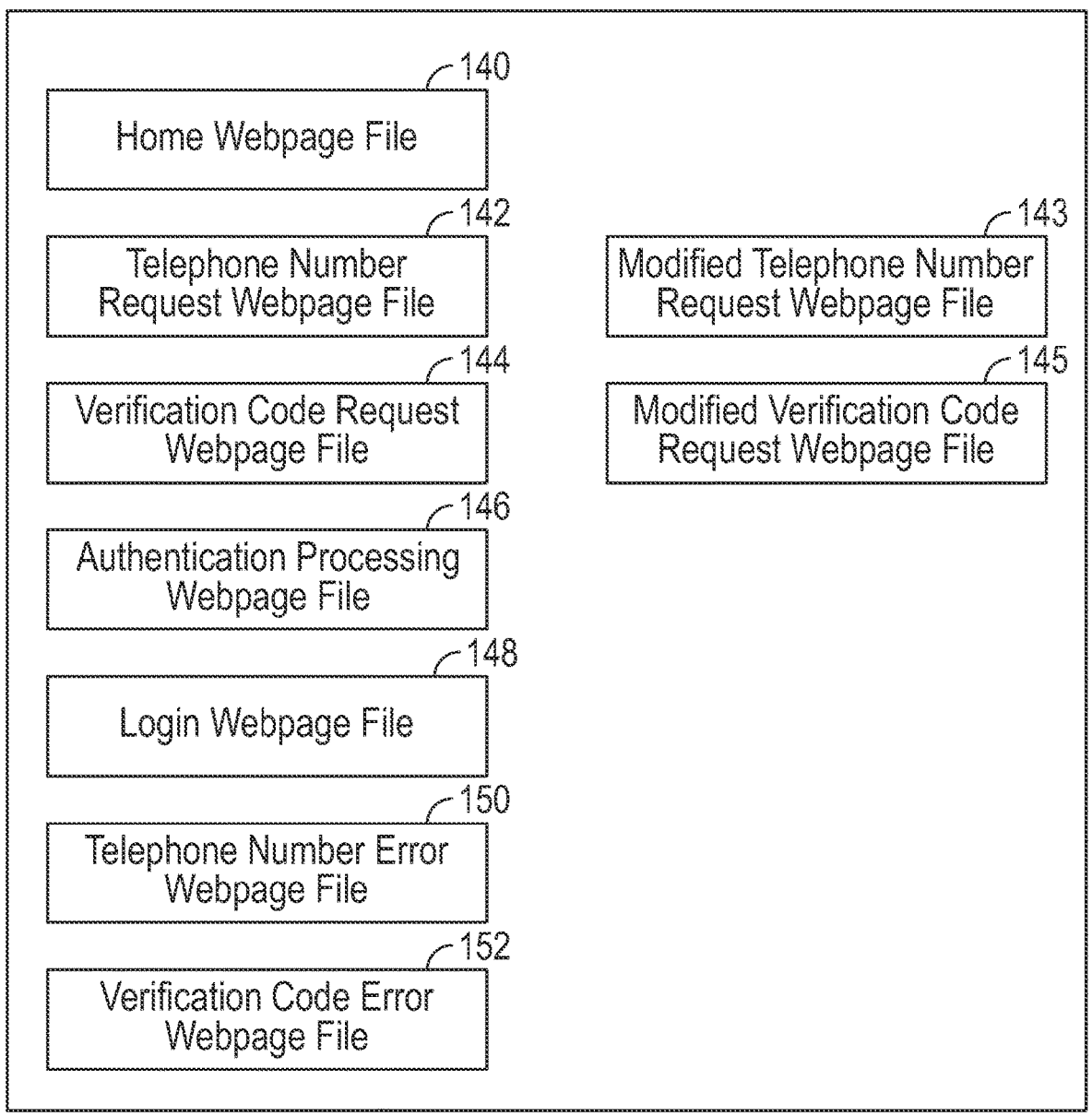
FIG. 4 is a block diagram of webpage files utilized by the monitoring system 44 of FIG. 1.
Figure 5:
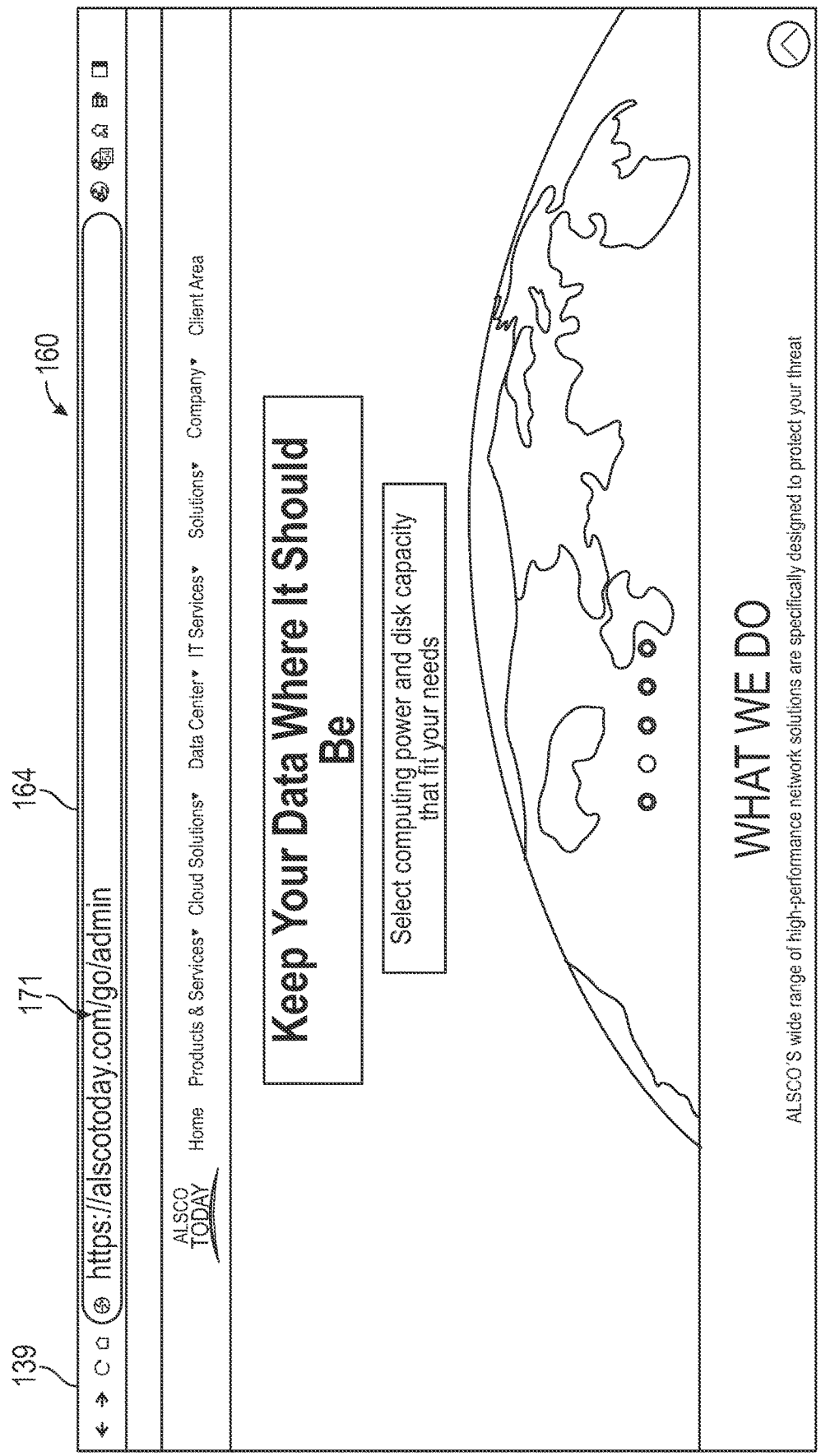
FIG. 5 is a schematic of a home webpage utilized in the monitoring system of FIG. 1.

Referring to FIGS. 1, 4 and 5, the home webpage file 140 corresponds to and is utilized by a web browser 139 to display a home webpage 160 on the display device 40. The web browser 139 that displays the home webpage 160 includes a URL input box 164 which allows a user to input a first request message 171 (e.g., https://alscotoday.com/go/admin") utilizing the first input device 37 that is received by the client computer 36.

Figure 6:
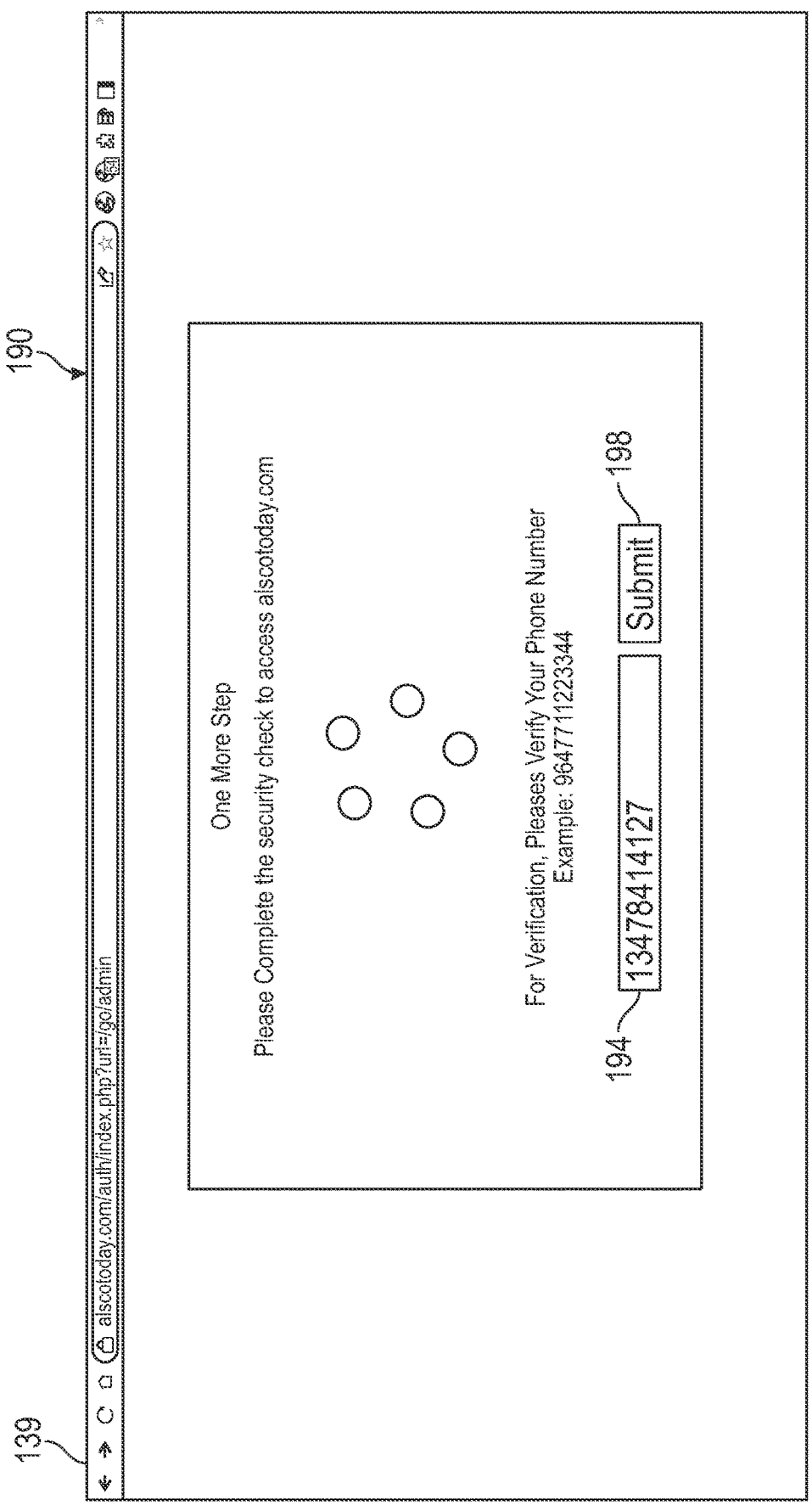
FIG. 6 is a schematic of a telephone number request webpage utilized in the monitoring system of FIG. 1.

Referring to FIGS. 4 and 6, the telephone number request webpage file 142 corresponds to and is utilized by a web browser 139 to display a telephone number request webpage 190 on the display device 40. The webpage 190 includes a text input box 194, and a submit command button 198. The text input box 194 allows a user to input a telephone number (e.g., 13478414127) therein utilizing the first input device 37 (e.g., keyboard). The submit command button 198 allows a user to send the telephone number in the text input box 194 to the secure computer server 70 when selected by the second input device 38 (e.g., mouse).

Figure 7:
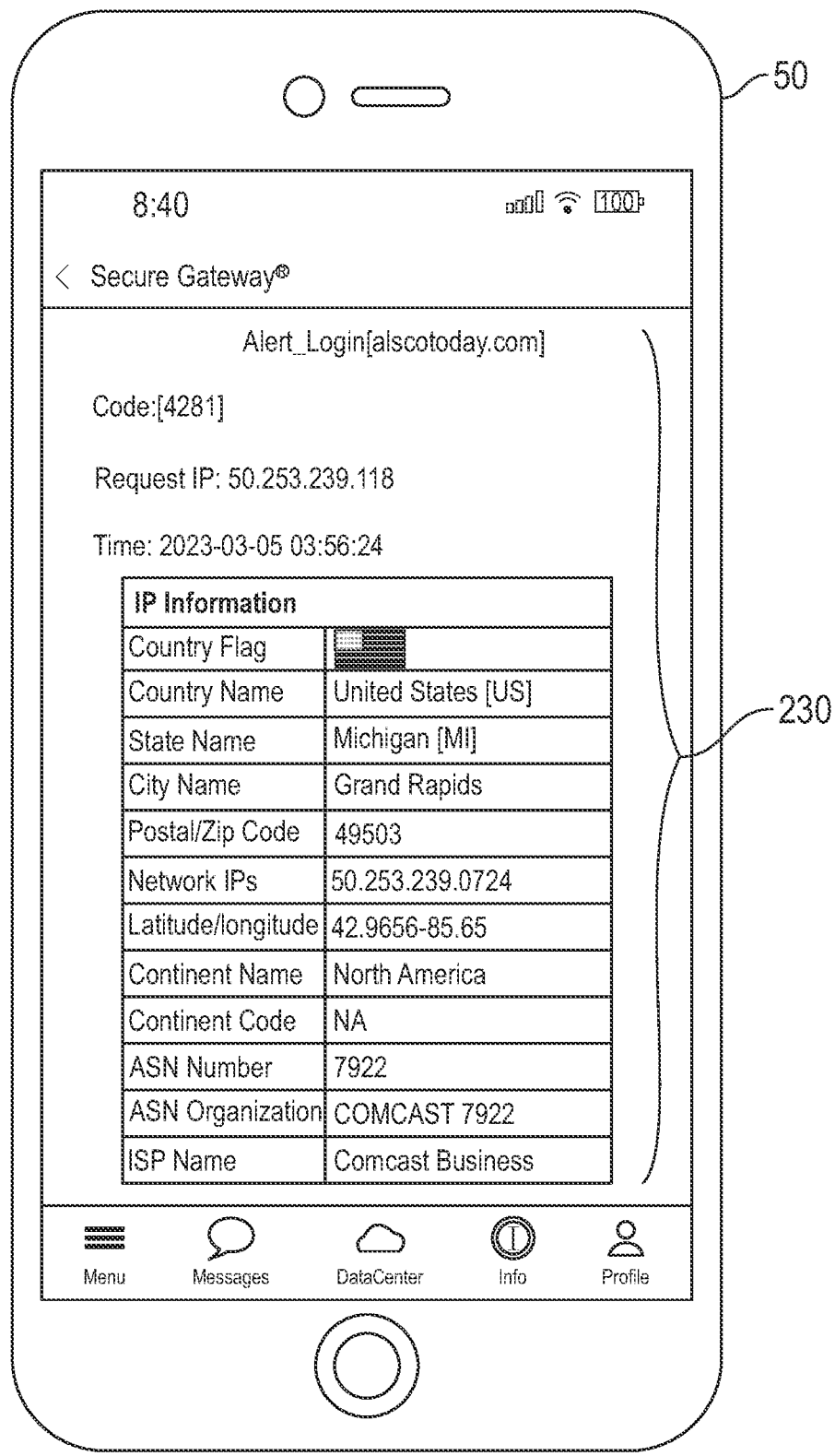
FIG. 7 is a schematic of a smart phone having a verification code message thereon that is utilized in the communication system of FIG. 1.

Referring to FIGS. 1 and 7, a smart phone 50 having a verification code message 230 thereon is illustrated. When a telephone number is received by the secure computer server 70 that corresponds to an authorized user in the registered user database 87, the secure computer server 70 sends the verification code message 230 to the smart phone 50 utilizing the telephone number.

Referring to FIGS. 1 and 2, the registered user database 87 identifies users authorized to login to the hosting computer server 46 is illustrated. In particular, the secure computer server 70 utilizes the registered user database 87 to determine whether a telephone number is associated with an authorized user. In an exemplary embodiment, the registered user database 87 includes records 100, 102. The record 100 includes an ID field (e.g., 85), a telephone number (e.g., 13478414127), a full name (e.g., Musafa Razzaq), an IP Address (e.g., 37.238.47.38), a type (e.g., Android), and a verification code (e.g., 4281). Further, the record 102 includes an ID field (e.g., 8), a telephone number (e.g., 16194938665), a full name (e.g., Mustafa AlQassi), an IP Address (e.g., 39.238.47.38), a type (e.g., ios), and a verification code (e.g., 5598). When the secure computer server 70 receives a telephone number that is identical to a telephone number in one of the records 100, 102, the telephone number corresponds to an authorized user.

The verification code message 230 includes a verification code (e.g., 4281) and the following IP information associated with the client computer 36: a country flag, a request IP address (e.g., 50.253.239.118), a state name (e.g., Michigan), a city name (e.g., Grand Rapids), a postal/zip code (e.g., 49503), a latitude/longitude (e.g., 42.656-85.65), a continent name (e.g., North America), a continent code (e.g., N/A), an ASN number (e.g., 7922), an ASN number (e.g., 7922), an ASN organization (e.g., Comcast 7922), and an ISP name (e.g., Comcast), and a time (e.g., 2023-03-05 03:56:24).

Referring to FIGS. 1, 2 and 3, the secure computer server 70 generates the verification code message 230 utilizing the verification code (e.g., 4281) associated with the received telephone number that matches a telephone number in the registered user database 87, and information in the IP database 89 that is associated with the first IP address (e.g., 50.253.239.118) of the client computer 36 that sent the modified telephone number request webpage file 143. The IP database 89 contains IP information associated with IP addresses of client computers. In an exemplary embodiment, the IP database 89 includes records 120, 122. The record 120 is associated with the client computer 36 and includes a country flag, a request IP address (e.g., 50.253.239,118), a state name (e.g., Michigan), a city name (e.g., Grand Rapids), a postal/zip code (e.g., 49503), a latitude/longitude (e.g., 42.656-85.65), a continent name (e.g., North America), a continent code (e.g., N/A), an ASN number (e.g., 7922), an ASN number (e.g., 7922), an ASN organization (e.g., Comcast 7922), and an ISP name (e.g., Comcast), and a time (e.g., 2023-03-05 03:56:24). Further, the record 122 is associated with another client computer (not shown) and includes a country flag, a request IP address (e.g., 49.255339.418), a state name (e.g., Michigan), a city name (e.g., Rochester Hills), a postal/zip code (e.g., 48307), a latitude/longitude (e.g., 44.9656-25.25), a continent name (e.g., North America), a continent code (e.g., N/A), an ASN number (e.g., 7924), an ASN number (e.g., 7924), an ASN organization (e.g., Comcast 7950), and an ISP name (e.g., Comcast), and a time (e.g., 2023-03-05 03:57:52).

Figure 8:
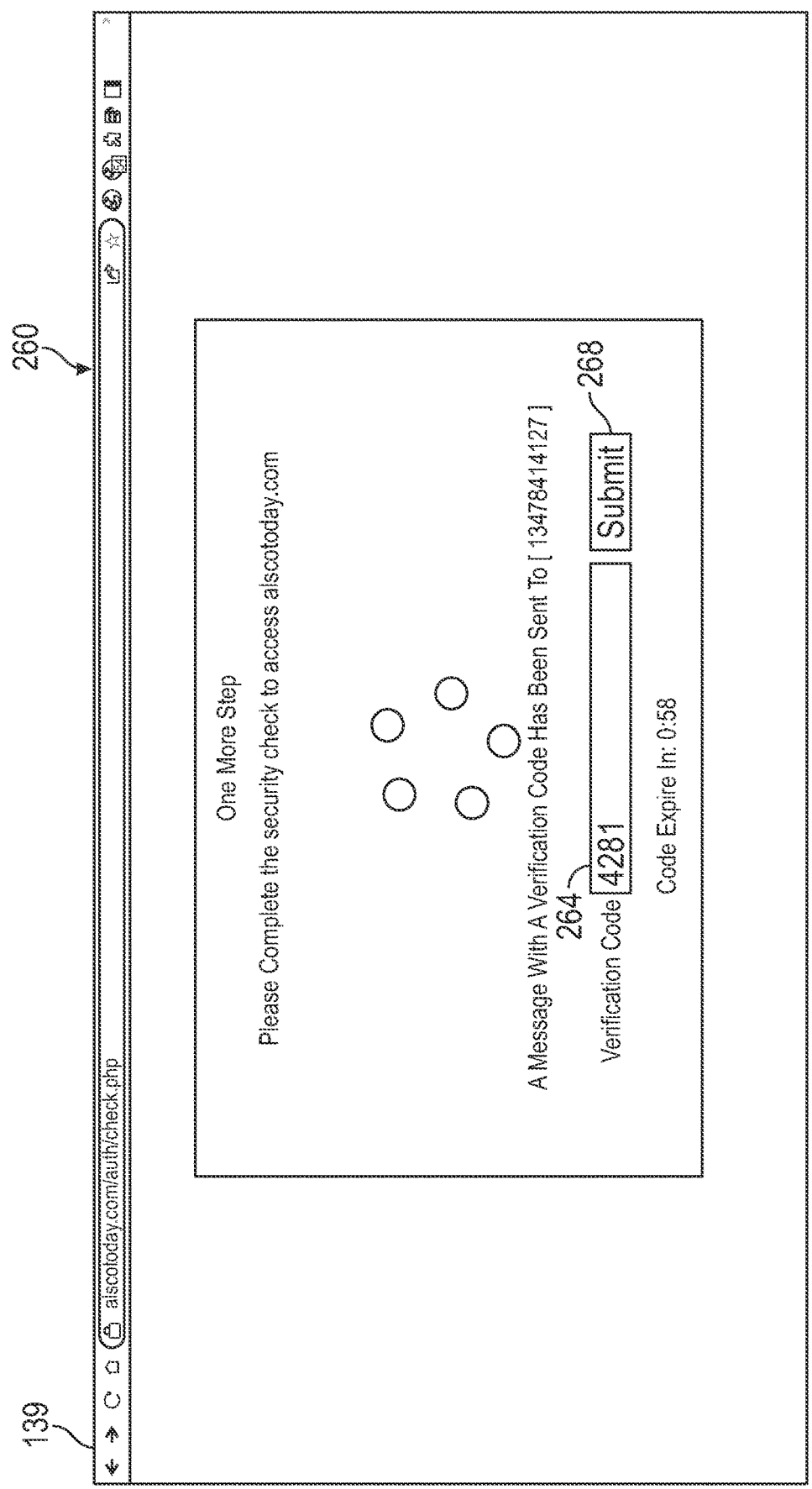
FIG. 8 is a schematic of a verification code request webpage utilized in the monitoring system of FIG. 1.
Figure 9:
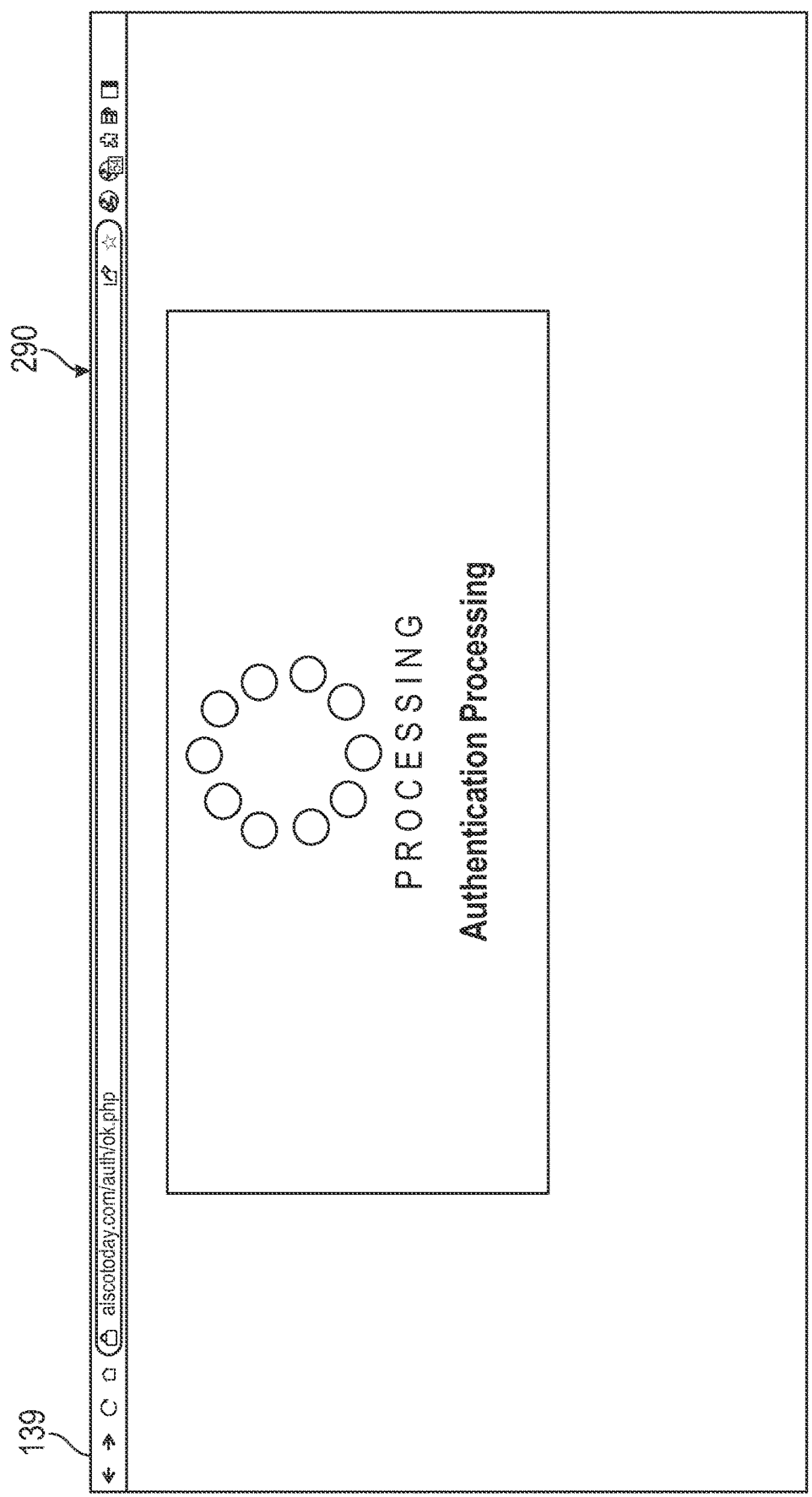
FIG. 9 is a schematic of an authentication processing webpage utilized in the monitoring system of FIG. 1.
Figure 10:
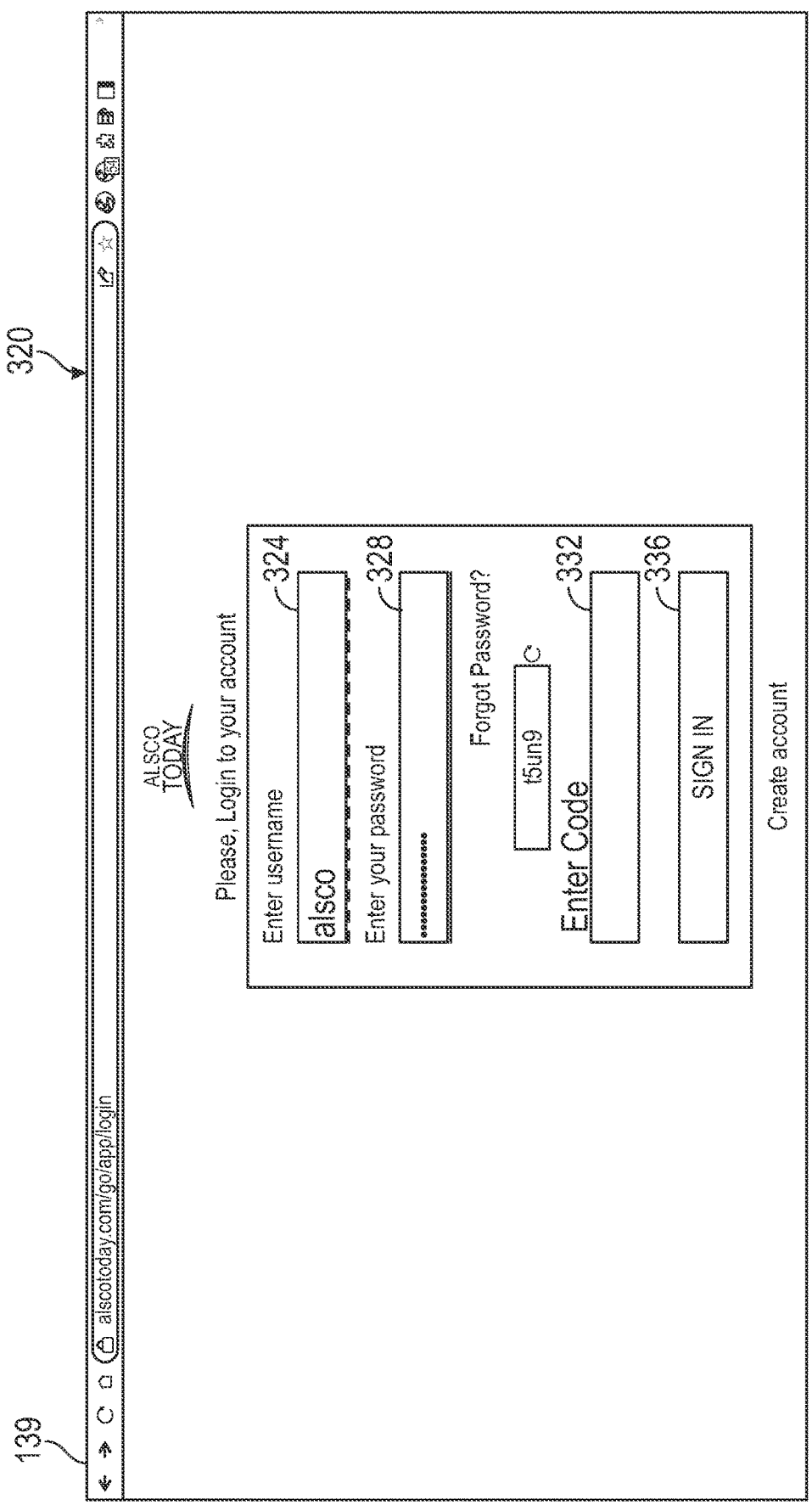
FIG. 10 is a schematic of a login webpage utilized in a hosting computer server of FIG. 1.

Referring to FIGS. 1, 4 and 8, the verification code request webpage file 144 corresponds to and is utilized by a web browser 139 to display a verification code request webpage 260 on the display device 40. The webpage 260 includes a text input box 264, and a submit command button 268. The text input box 264 allows a user to input a verification code (e.g., 4281) therein utilizing the first input device 37 (e.g., keyboard). The submit command button 198 allows a user to send the verification code in the text input box 264 to the secure computer server 70 when selected by the second input device 38 (e.g., mouse).

Referring to FIGS. 1, 4, 9 and 20, the authentication processing webpage file 146 corresponds to and is utilized by a web browser 139 to display an authentication processing webpage 290 on the display device 40. The webpage 290 is displayed when a user has inputted a valid telephone number and a valid verification code while the secure computer server 70 is generating a secure communication channel 52 between the client computer 36 and the hosting computer server 46.

Referring to FIGS. 1, 4, 10 and 20, the login webpage file 148 corresponds to and is utilized by a web browser 139 to display the login webpage 320 on the display device 40. The webpage 320 is displayed after the secure computer server 70 has generated the secure communication channel 52 between the client computer 36 and the hosting computer server 46. The login webpage 320 allows an authorized user to log into the hosting computer server 46. The login webpage 320 has a user text box 324, a password text box 328, a code text box 332, and a sign in command button 336. The username text input box 324 allows a user to input a username utilizing the first input device 37 (e.g., keyboard). The password text box 328 allows a user to input a password utilizing the first input device 37. The code text box 332 allows a user to input a code utilizing the first input device 37. The sign in command button 336 allows a user to send the username, the password, and the code to the hosting computer server 46 when selected by the second input device 38 (e.g., mouse). When the username, the password, and the code correspond to an associated username, password and code (stored in the hosting computer server 46), respectively, the client computer 36 communicates directly with the hosting computer server 46 via the secure communication channel 52.

Figure 11:
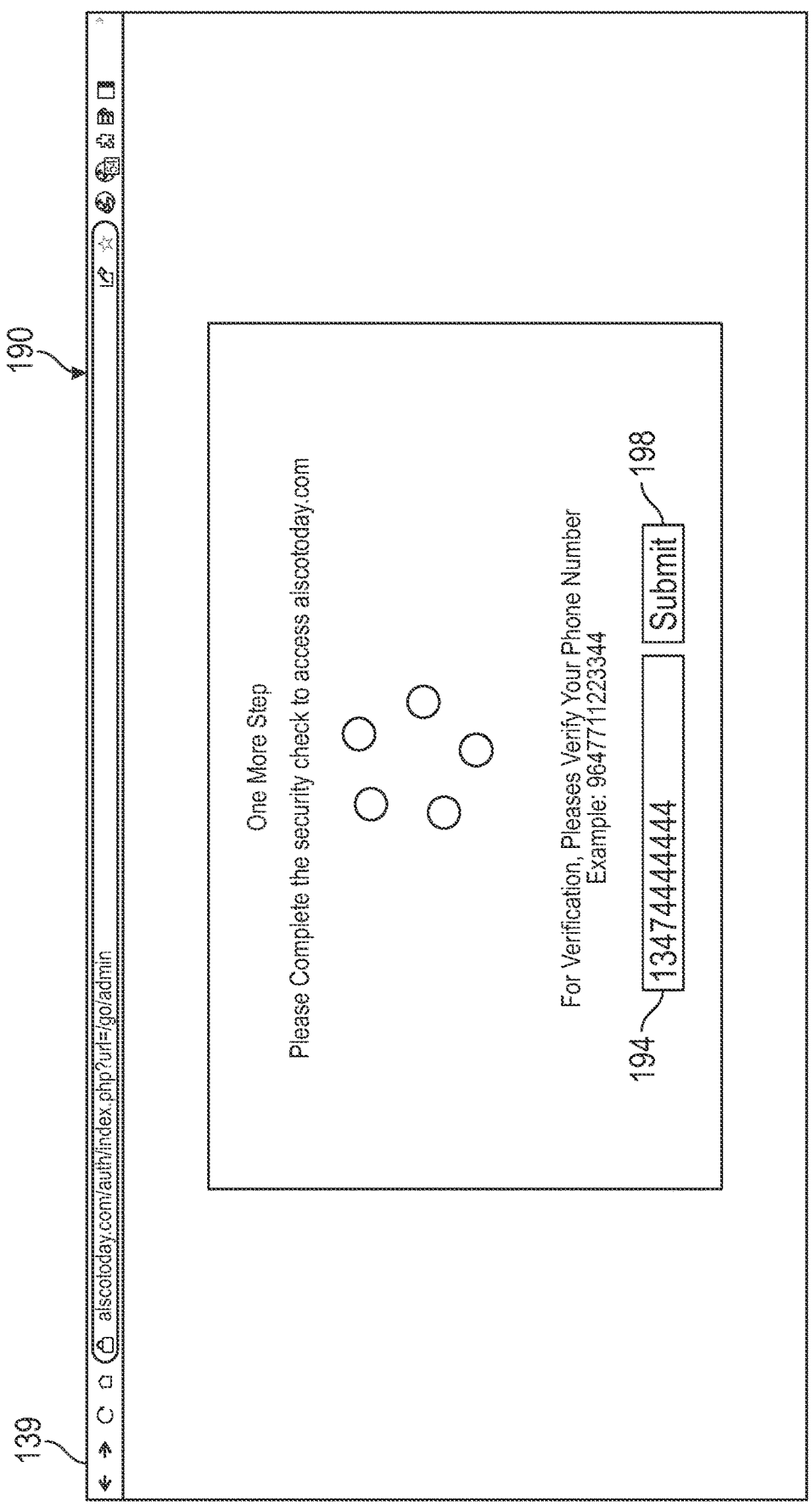
FIG. 11 is another schematic of the telephone number request webpage of FIG. 6.
Figure 12:
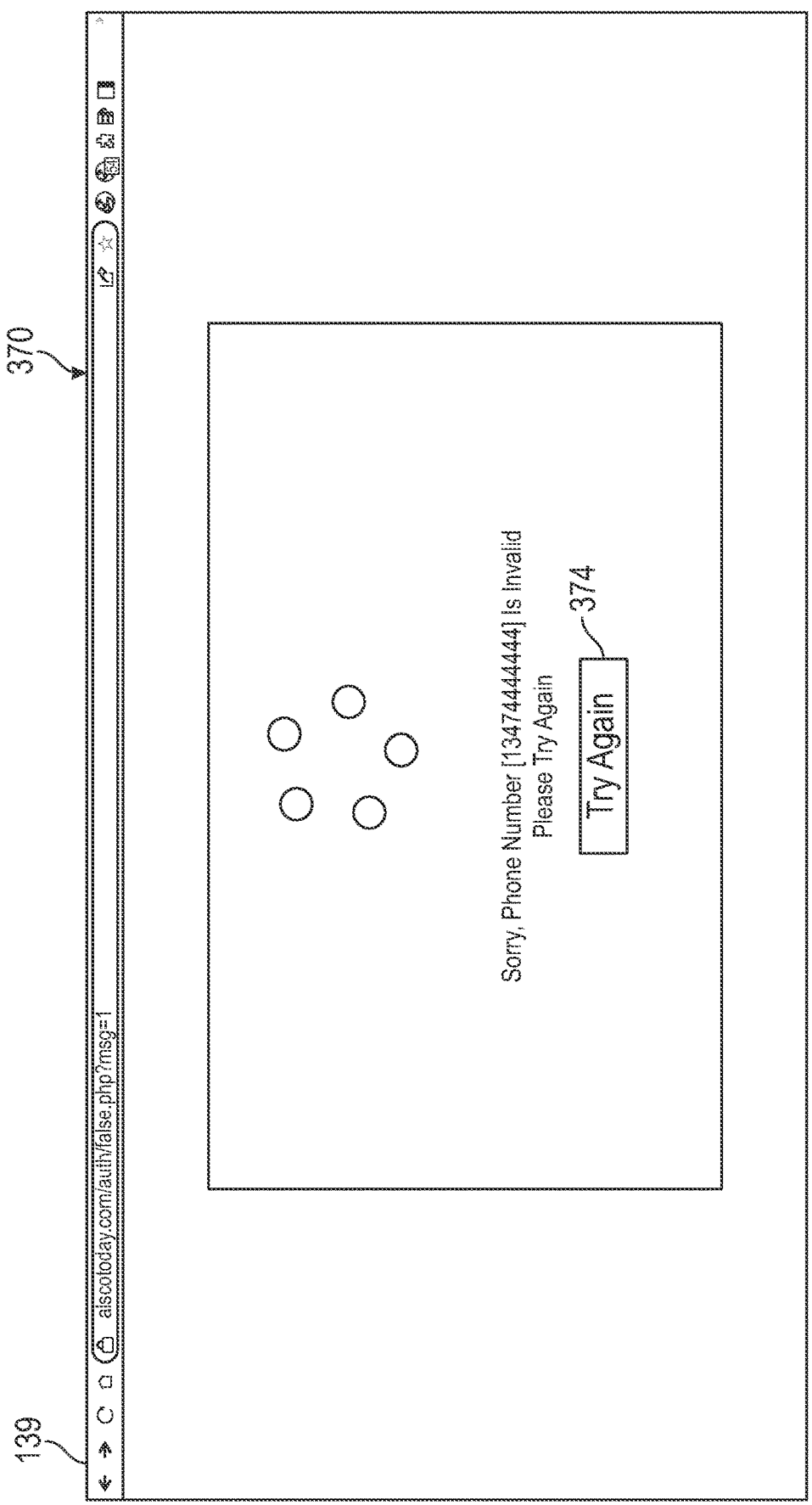
FIG. 12 is a schematic of telephone number error webpage utilized in the monitoring system of FIG. 1.

Referring to FIGS. 1, 11 and 12, a brief explanation of the functionality of the monitoring system 44 that occurs when a user enters an invalid telephone number will be explained. Referring to the telephone request webpage 190 (shown in FIG. 11), when a user inputs an invalid telephone number (e.g., 13474444444) in the text box 194 that does not match any telephone number in the registered user database 87 (shown in FIG. 2), the telephone number error webpage 370 (e.g., shown in FIG. 12) is displayed. The telephone number error webpage 370 is generated by a web browser 139 utilizing the telephone number error webpage file 150. The webpage 370 has a try again command button 374. When the user selects the button 374 utilizing the second input device 38, the telephone request webpage 190 (shown in FIG. 6) is displayed so that the user can input another telephone number.

Figure 13:
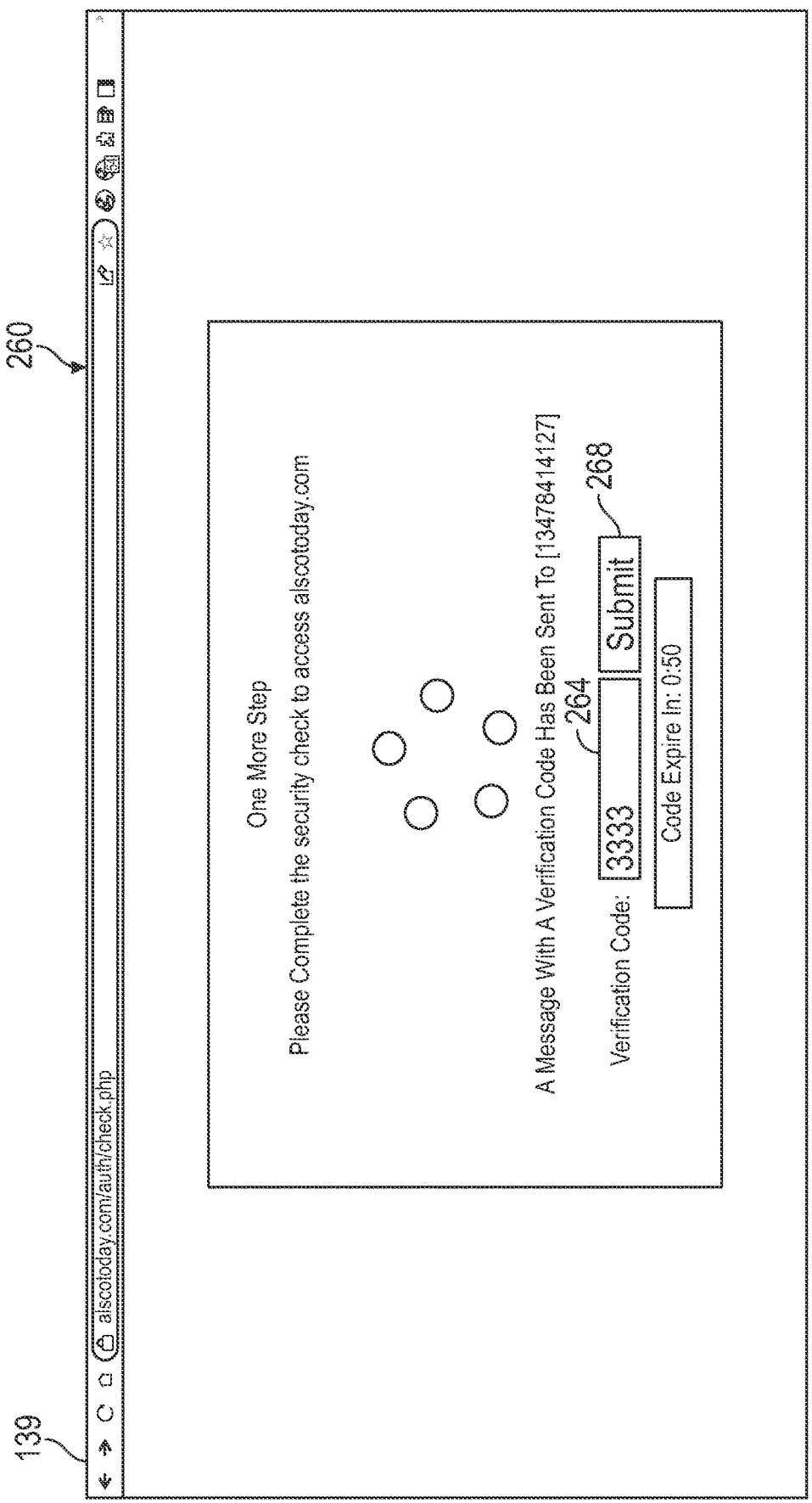
FIG. 13 is a schematic of a verification code request webpage utilized in the monitoring system of FIG. 1.
Figure 14:
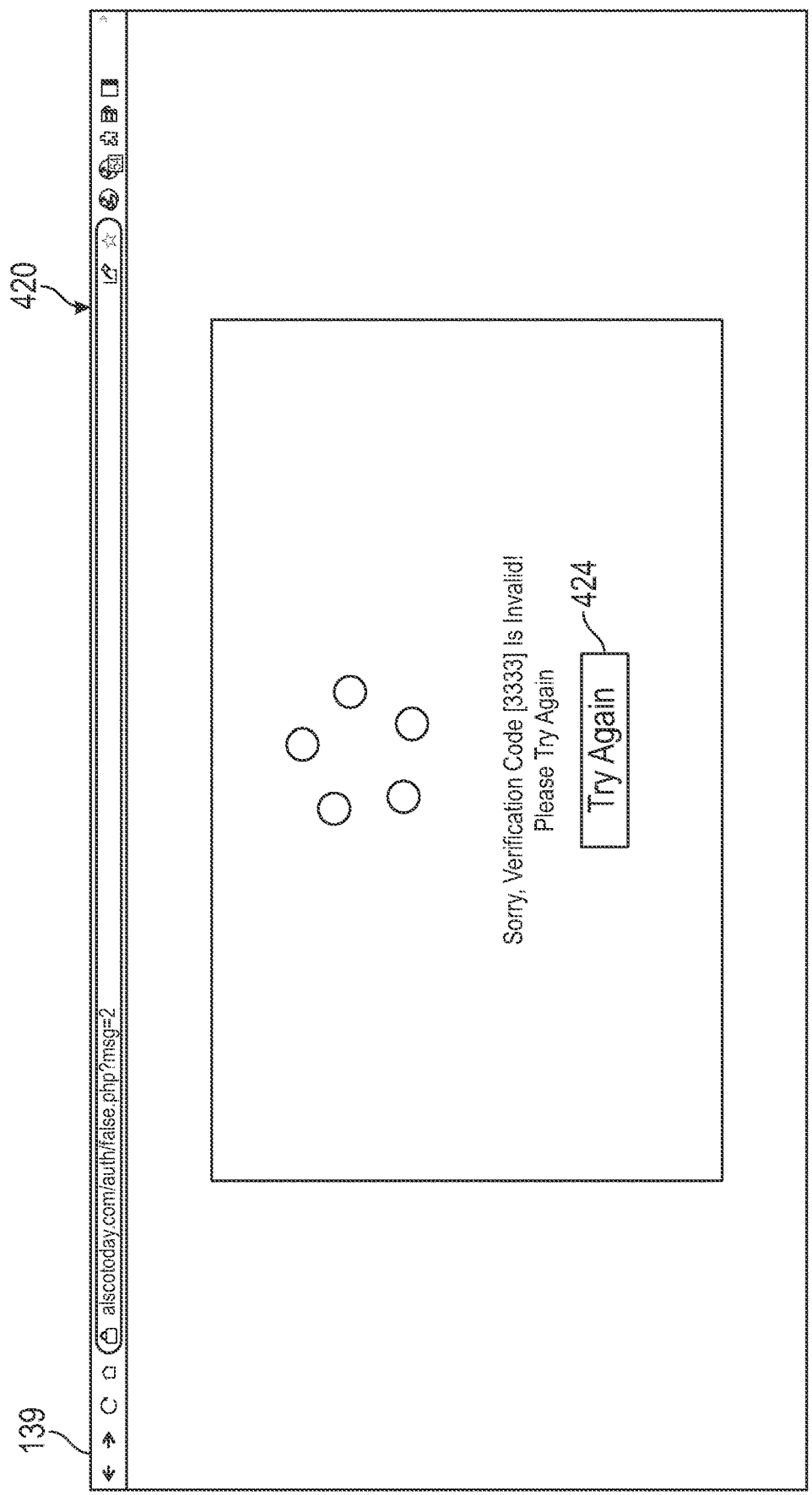
FIG. 14 is a schematic of a verification code error webpage utilized in the monitoring system of FIG. 1.
Figure 15:
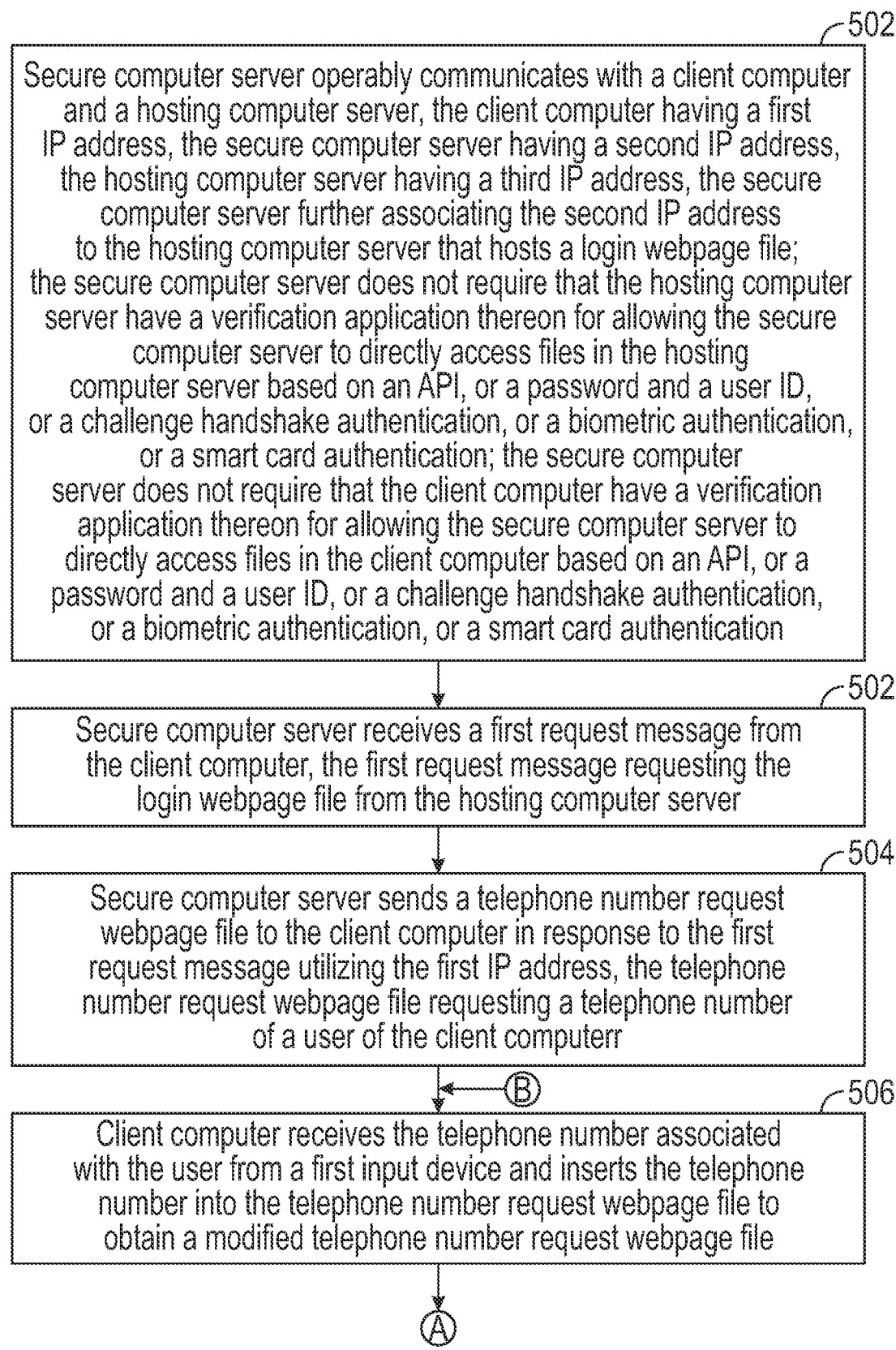
FIGS. 15-19 are flowcharts of a method for providing a secure communication channel between the client computer and the hosting computer server utilizing the monitoring system of FIG. 1.
Figure 16:
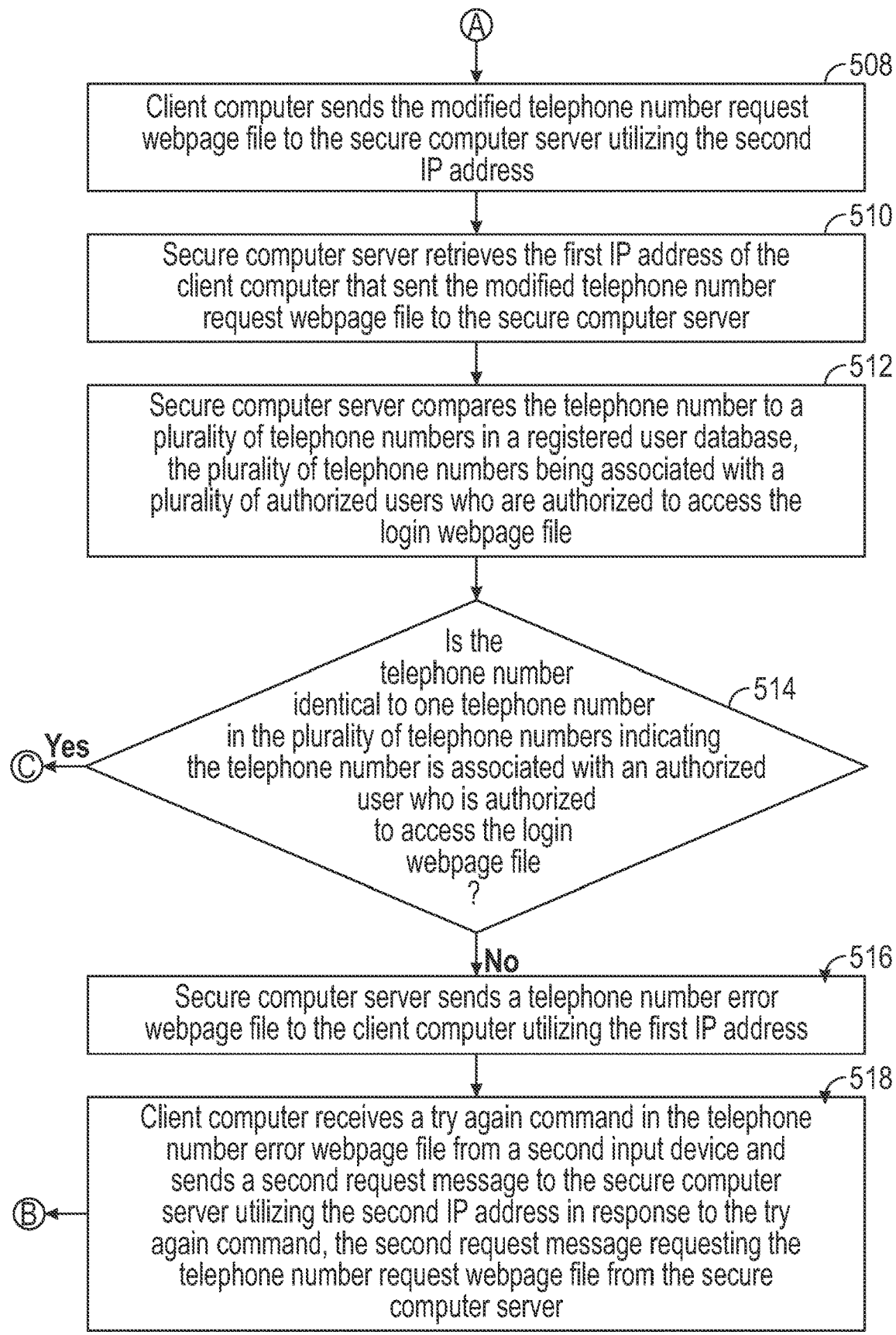
Figure 17:
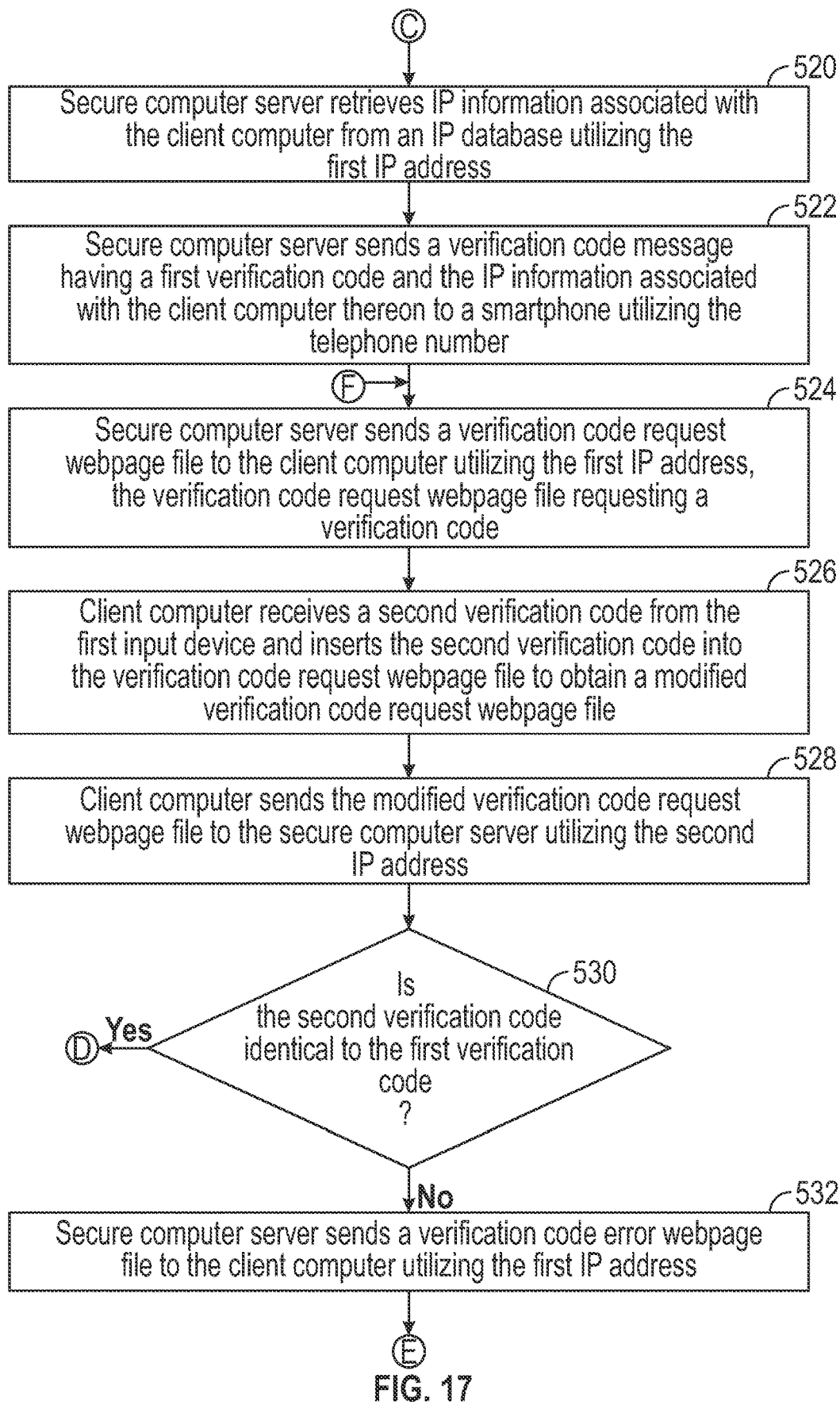
Figure 18:
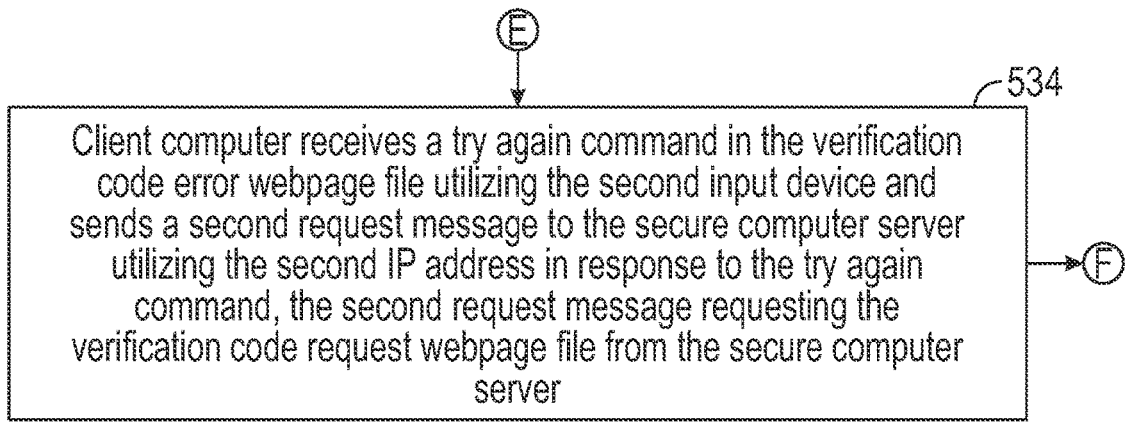
Figure 19:
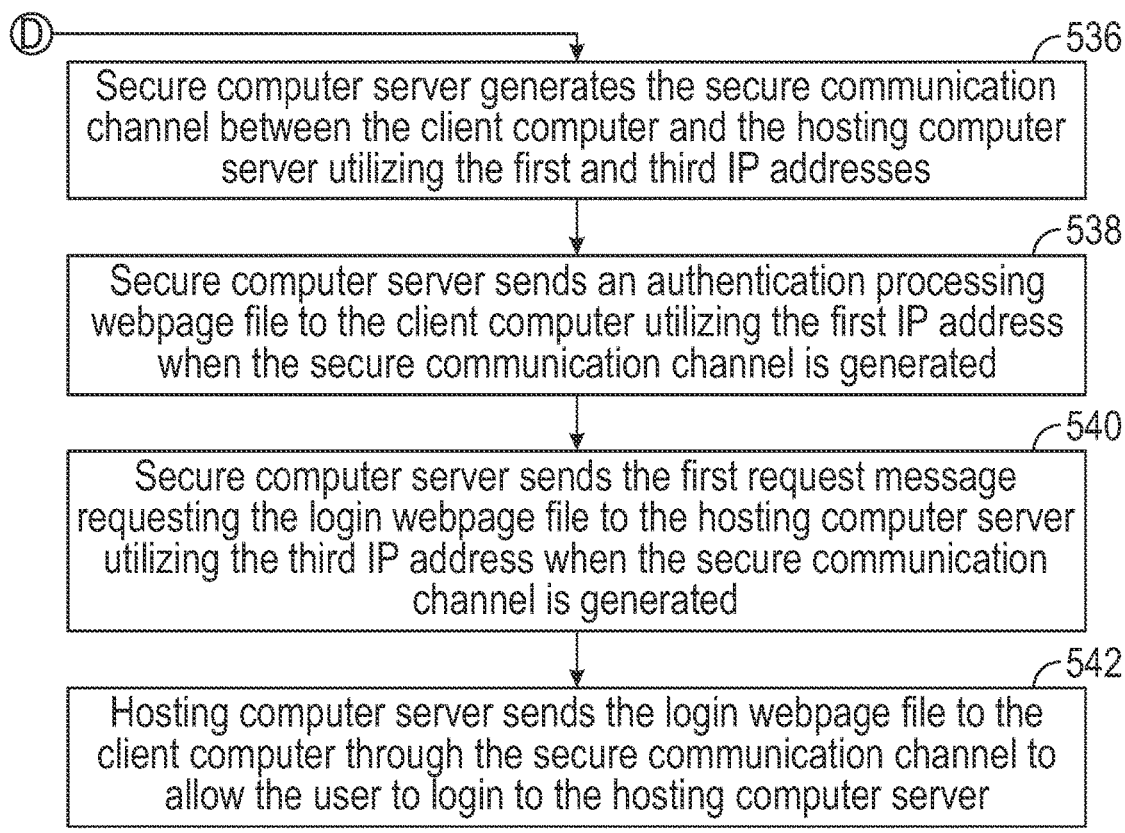

Referring to FIGS. 1, 13 and 14, a brief explanation of the functionality of the monitoring system 44 that occurs when a user enters an invalid verification code will be explained. Referring to the verification code request webpage 260 (shown in FIG. 13), when a user inputs an invalid verification code (e.g., 3333) in the text input box 264 that does not match any verification code in the registered user database 87 (shown in FIG. 2), the verification code error webpage 420 (shown in FIG. 14) is displayed. The verification code error webpage 420 is generated by a web browser 139 utilizing the verification code error webpage file 152 (shown in FIG. 4). The webpage 420 has a try again command button 424. When the user selects the button 424 utilizing the second input device 38, the verification code request webpage 260 (shown in FIG. 13) is displayed so that the user can input another verification code.

Hosting Computer Server

Referring to FIGS. 1 and 20, the hosting computer server 46 operably communicates with the secure computer server 70 through a secure communication channel 52 in the Internet 42. The hosting computer server 46 further operably communicates with the client computer 36 through the secure computer server 70 via the secure communication channel 52 only after the secure computer server 70 has generated the secure communication channel 52.

Flowchart

Referring to FIGS. 1, 4 and 15-19, a flowchart of a method for providing a secure communication channel 52 between a client computer 36 and a hosting computer server 46 will now be explained.

At step 500, the secure computer server 70 operably communicates with a client computer 36 and a hosting computer server 46. The client computer 36 has a first IP address. The secure computer server 70 has a second IP address. The hosting computer server 46 has a third IP address. The secure computer server 70 further associates the second IP address to the hosting computer server 46 that hosts a login webpage file 148. The secure computer server 70 does not require that the hosting computer server 46 have a verification application thereon for allowing the secure computer server 70 to directly access files in the hosting computer server 46 based on an API, or a password and a user ID, or a challenge handshake authentication, or a biometric authentication, or a smart card authentication. The secure computer server 70 does not require that the client computer 36 have a verification application thereon for allowing the secure computer server 70 to directly access files in the client computer 36 based on an API, or a password and a user ID, or a challenge handshake authentication, or a biometric authentication, or a smart card authentication. After step 500, the method advances to step 502.

At step 502, the secure computer server 70 receives a first request message from the client computer 36. The first request message requests the login webpage file 148 from the hosting computer server 46. After step 502, the method advances to step 504.

At step 504, the secure computer server 70 sends a telephone number request webpage file 142 to the client computer 36 in response to the first request message utilizing the first IP address. The telephone number request webpage file 142 requests a telephone number of a user of the client computer 36. After step 504, the method advances to step 506.

At step 506, the client computer 36 receives the telephone number associated with the user from a first input device 37 and inserts the telephone number into the telephone number request webpage file 142 to obtain a modified telephone number request webpage file 143. After step 506, the method advances to step 508.

At step 508, the client computer 36 sends the modified telephone number request webpage file 143 to the secure computer server 70 utilizing the second IP address. After step 508, the method advances to step 510.

At step 510, the secure computer server 70 retrieves the first IP address of the client computer 36 that sent the modified telephone number request webpage file 143 to the secure computer server 70. After step 510, the method advances to step 512.

At step 512, the secure computer server 70 compares the telephone number to a plurality of telephone numbers in a registered user database 87. The plurality of telephone numbers are associated with a plurality of authorized users who are authorized to access the login webpage file 148. After step 512, the method advances to step 514.

At step 514, the secure computer server 70 makes a determination as to whether the telephone number is identical to one telephone number in the plurality of telephone numbers indicating the telephone number is associated with an authorized user who is authorized to access the login webpage file 148. If the value of step 514 equals "yes", the method advances to step 520. Otherwise, the method advances to step 516.

At step 516, the secure computer server 70 sends a telephone number error webpage file to the client computer 36 utilizing the first IP address. After step 516, the method advances step 518.

At step 518, the client computer 36 receives a try again command in the telephone number error webpage file 150 from a second input device 38 and sends a second request message to the secure computer server 70 utilizing the second IP address in response to the try again command. The second request message requests the telephone number request webpage file 142 from the secure computer server 70. After step 518, the method returns to step 506.

Referring again to step 514, if the value of step 514 equals "yes", the method advances to step 520. At step 520, the secure computer server 70 retrieves IP information associated with the client computer 36 from an IP database 89 utilizing the first IP address. After step 520, the method advances to step 522.

At step 522, the secure computer server 70 sends a verification code message having a first verification code and the IP information associated with the client computer 36 thereon to a smartphone 50 utilizing the telephone number. After step 522, the method advances to step 524.

At step 524, the secure computer server 70 sends a verification code request webpage file 144 to the client computer 36 utilizing the first IP address. The verification code request webpage file 144 requests a verification code. After step 524, the method advances to step 526.

At step 526, the client computer 36 receives a second verification code from the first input device 37 and inserts the second verification code into the verification code request webpage file 144 to obtain a modified verification code request webpage file 145. After step 526, the method advances to step 528.

At step 528, the client computer 36 sends the modified verification code request webpage file 145 to the secure computer server 70 utilizing the second IP address. After step 528, the method advances to step 530.

At step 530, the secure computer server 70 makes a determination as to whether the second verification code is identical to the first verification code. If the value of step 530 equals "no", the method advances to step 532. Otherwise, the method advances to step 536.

At step 532, the secure computer server 70 sends a verification code error webpage file 152 to the client computer 36 utilizing the first IP address. After step 532, the method advances to step 534.

At step 534, the client computer 36 receives a try again command in the verification code error webpage file 152 utilizing the second input device 38 and sends a second request message to the secure computer server 70 utilizing the second IP address in response to the try again command. The second request message requests the verification code request webpage file 144 from the secure computer server 70. After step 534, the method returns to step 524.

Referring again to step 530, if the value of step 530 equals "yes", the method advances to step 536. At step 536, the secure computer server 70 generates the secure communication channel 52 between the client computer 36 and the hosting computer server 46 utilizing the first and third IP addresses. After step 536, the method advances to step 538.

At step 538, the secure computer server 70 sends an authentication processing webpage file 146 to the client computer 36 utilizing the first IP address when the secure communication channel 52 is generated. After step 538, the method advances to step 540.

At step 540, the secure computer server 70 sends the first request message requesting the login webpage file 148 to the hosting computer server 46 utilizing the third IP address when the secure communication channel 52 is generated. After step 540, the method advances to step 542.

At step 542, the hosting computer server 46 sends the login webpage file 148 to the client computer 36 through the secure communication channel 52 to allow the user to login to the hosting computer server 46.

The monitoring system 44 described herein provides a substantial advantage over other systems. In particular, the monitoring system 44 utilizes two-way authentication to authenticate a user, and thereafter sets up a secure communication channel 52 between the client computer 36 and a hosting computer server 46 utilizing an intermediate secure computer server 70 without utilizing an API, or a password and a user ID, or a challenge handshake authentication, or a biometric authentication.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A monitoring system for providing a secure communication channel between a client computer and a hosting computer server, comprising:
   a secure computer server operably communicating with the client computer and the hosting computer server, the client computer having a first internet protocol (IP) address, the secure computer server having a second IP address, the hosting computer server having a third IP address, the secure computer server further associating the second IP address to the hosting computer server that hosts a login webpage file;
   the secure computer server receiving a first request message from the client computer, the first request message requesting the login webpage file from the hosting computer server;
   the secure computer server sending a telephone number request webpage file to the client computer in response to the first request message utilizing the first IP address, the telephone number request webpage file requesting a telephone number of a user of the client computer;
   the client computer inserting a telephone number associated with the user into the telephone number request webpage file to obtain a modified telephone number request webpage file and sending the modified telephone number request webpage file to the secure computer server utilizing the second IP address;
   the secure computer server sending a verification code message having a first verification code thereon to a smartphone utilizing the telephone number, when the telephone number is associated with an authorized user who is authorized to access the login webpage file;
   the secure computer server sending a verification code request webpage file to the client computer utilizing the first IP address when the telephone number is associated with the authorized user who is authorized to access the login webpage file, the verification code request webpage file requesting a verification code;
   the client computer inserting a second verification code into the verification code request webpage file to obtain a modified verification code request webpage file and sending the modified verification code request webpage file to the secure computer server utilizing the second IP address;
   the secure computer server sending a verification code error webpage file to the client computer utilizing the first IP address, when the second verification code is not identical to the first verification code;
   the client computer receiving a try again command in the verification code error webpage file and sending a second request message to the secure computer server utilizing the second IP address in response to the try again command, the second request message requesting the verification code request webpage file from the secure computer server;
   the secure computer server generating the secure communication channel between the client computer and the hosting computer server utilizing the first and third IP addresses when the second verification code is identical to the first verification code; and
   the secure computer server sending the first request message requesting the login webpage file to the hosting computer server utilizing the third IP address when the secure communication channel is generated.

2. The monitoring system of claim 1, wherein the secure computer server does not require that the hosting computer server have a verification application thereon for allowing the secure computer server to directly access files in the hosting computer server based on an application programming interface (API), or a password and a user identification (ID), or a challenge handshake authentication, or a biometric authentication, or a smart card authentication.

3. The monitoring system of claim 1, wherein the secure computer server does not require that the client computer have a verification application thereon for allowing the secure computer server to directly access files in the client computer based on an application programming interface (API) API, or a password and a user identification (ID), or a challenge handshake authentication, or a biometric authentication, or a smart card authentication.

4. The monitoring system of claim 1, wherein:
   the hosting computer server sending the login webpage file to the client computer through the secure communication channel to allow the user to login to the hosting computer server.

5. The monitoring system of claim 1, wherein:
   the secure computer server comparing the telephone number to a plurality of telephone numbers associated with a plurality of authorized users who are authorized to access the login webpage file; and
   the secure computer server determining that the user is the authorized user if the telephone number is identical to one telephone number in the plurality of telephone numbers.

6. The monitoring system of claim 1, wherein:
   the secure computer server retrieving the first IP address of the client computer that sent the modified telephone number request webpage file to the secure computer server; and
   the secure computer server retrieving IP information associated with the client computer from an IP database utilizing the first IP address.

7. The monitoring system of claim 6, wherein:
   the verification code message includes the IP information associated with the client computer.

8. The monitoring system of claim 7, wherein: the IP information includes at least one of a country name, a state name, a city name, a postal code, a network IP address, a latitude/longitude, a continent name, a continent code, an autonomous system (AS) number, an AS organization code, and an internet service provider (ISP) name.

9. The monitoring system of claim 1, wherein:
   the client computer receiving the telephone number from an input device, and the client computer inserting the telephone number into the telephone number request webpage file to obtain the modified telephone number request webpage file.

* * * * *